(12) United States Patent
Lewis et al.

(10) Patent No.: US 12,549,387 B2
(45) Date of Patent: Feb. 10, 2026

(54) SECURE METHOD OF BI-DIRECTIONAL INLINE EXCHANGE OF CRYPTOGRAPHIC CERTIFICATES FOR DATA TRANSFERS

(71) Applicant: Dell Products L.P., Round Rock, TX (US)

(72) Inventors: Donna Barry Lewis, Holly Springs, NC (US); Abhidnya Sushant Joshi, Pune (IN); Senthilkumar Ponnuswamy, San Jose, CA (US); Mahadev Karadigudda, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 18/194,104

(22) Filed: Mar. 31, 2023

(65) Prior Publication Data

US 2024/0333528 A1    Oct. 3, 2024

(51) Int. Cl.
  *H04L 9/32* (2006.01)
  *H04L 9/40* (2022.01)
(52) U.S. Cl.
  CPC ........ *H04L 9/3268* (2013.01); *H04L 63/0428* (2013.01); *H04L 63/166* (2013.01)
(58) Field of Classification Search
  CPC .................................................... H04L 9/3268
  See application file for complete search history.

(56) References Cited

U.S. PATENT DOCUMENTS

| | | | | |
|---|---|---|---|---|
| 12,015,721 B1 * | 6/2024 | Kumar | ................... | H04L 9/3263 |
| 2013/0067552 A1 * | 3/2013 | Hawkes | ................ | H04W 12/08 726/7 |
| 2016/0373418 A1 * | 12/2016 | Ståhl | ....................... | G06F 21/44 |
| 2021/0119800 A1 * | 4/2021 | Jung | ..................... | H04L 9/3242 |

FOREIGN PATENT DOCUMENTS

WO    WO-2016147567 A1 *    9/2016    ............. G06F 21/62

* cited by examiner

*Primary Examiner* — Esther B. Henderson
(74) *Attorney, Agent, or Firm* — Staniford Tomita LLP

(57) ABSTRACT

Embodiments for securely exchanging Certificate Authority (CA) certificates inline and bi-directionally to make it easier for client-server transmissions to use certificate-based authentication. The client certificate is transferred securely through encryption with a pre-shared key based on certain parameters, and the server certificate is transferred securely through encryption with a pre-shared key based on the parameters. The process reduces the burden from applications to maintain and save the CA certificate. It also reduces the burden from server to maintain and save the CA certificate of the client so that server can select it to be used during authentication. This helps enable large scale deployments where the server can maintain the CA certificate and send it to client.

20 Claims, 6 Drawing Sheets

SECURE METHOD OF BI-DIRECTIONAL INLINE EXCHANGE OF CRYPTOGRAPHIC CERTIFICATES FOR DATA TRANSFERS

TECHNICAL FIELD

This invention relates generally to large-scale data backup systems, and more specifically to securely exchanging cryptographic certificates for data transfers.

BACKGROUND

Data protection comprising backup and recovery software products are crucial for enterprise-level network clients. Customers rely on backup systems to efficiently back up and recover data in the event of user error, data loss, system outages, hardware failure, or other catastrophic events to allow business applications to remain in service or quickly come back up to service after a failure condition or an outage. In a typical data backup system, a large number (e.g., hundreds to thousands) of clients (data sources) send data for backup in a storage system, such as a DellEMC Data Domain device, while a backup server orchestrates the workflow for backing up the user data from the various clients.

Security is a prime requirement in any network transmission protocol, almost every protocol implements a secure way of authenticating senders and receivers of data. Even though many custom ways of authentication and encryption exist, SSL-TLS (Secure Socket Layer-Transport Layer Security) protocol is most recommended and commonly used. The SSL-TLS protocol can be used within other protocols as well. For example, the Dell DDBoost protocol can be used to provide inline deduplication to Data Domain appliance, uses SSL-TLS from within the RPC protocol. Using certificate-based authentication is recommended and, in fact, is often a prime requirement for various certifications and compliance for a product. With this requirement, managing, deploying, and updating the certificates in a large-scale environment with thousands of clients and few servers can be very challenging.

Previous solutions have involved a server securely sending a certificate authority (CA) certificate to the client 'inline' as part of the authentication sequence in an encrypted way, which in turn can be used to verify server identity by the client. Such a system, however, is limited to only providing one-way inline verification to verify the server to the client. Unfortunately, this does not provide any verification of the client to the server. What is further needed therefore, is a method of easily verifying the client to the server in an efficient inline process.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer, and Data Domain Boost are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
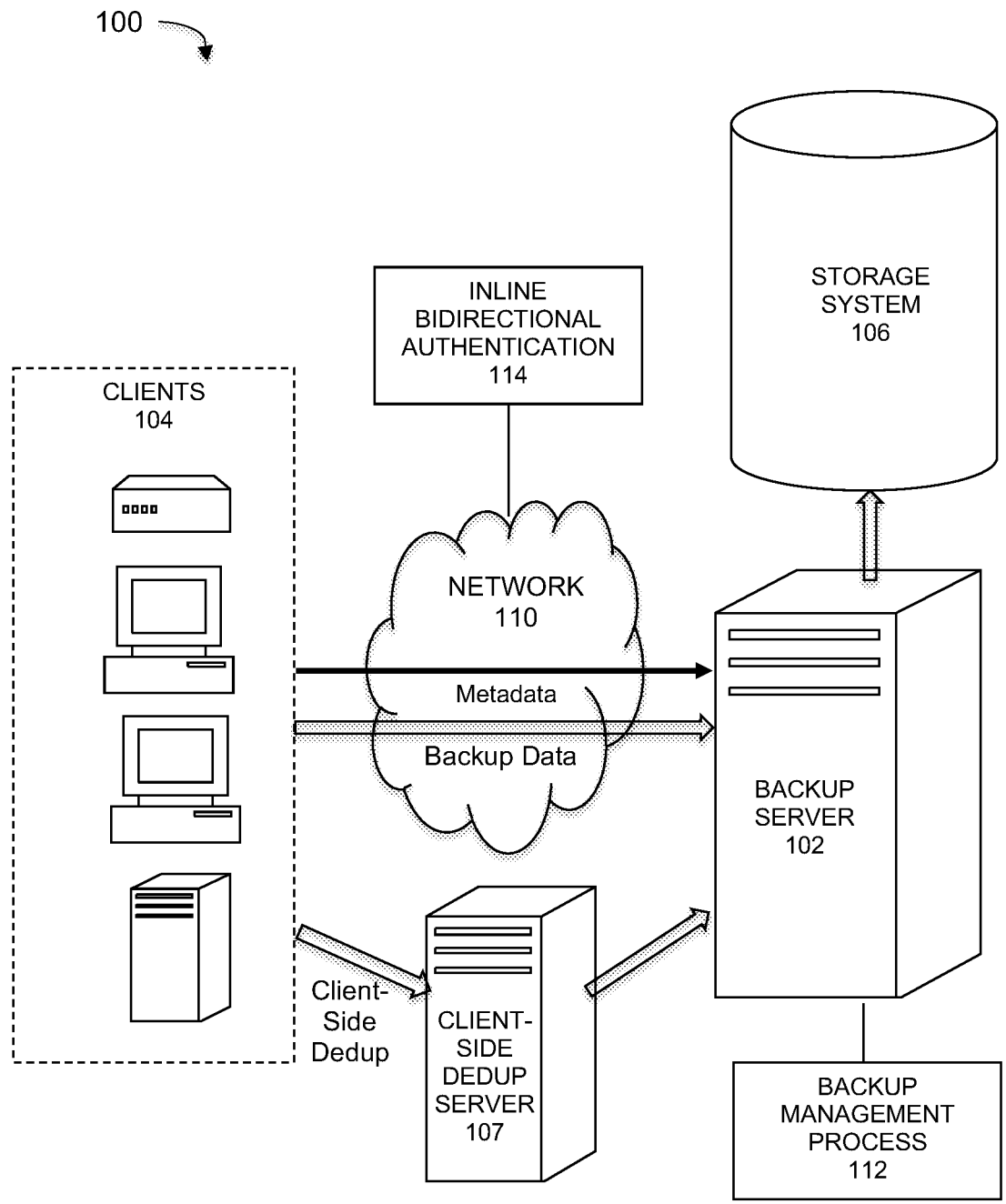
FIG. 1 is a diagram of a data storage system implementing secure bi-directional inline server-client authentication, under some embodiments.

A detailed description of one or more embodiments is provided below along with accompanying figures that illustrate the principles of the described embodiments. While aspects are described in conjunction with such embodiment (s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), or metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. Any such network may be implemented using protocols such as Transmission Control Protocol (TCP) and/or Internet Protocol (IP), well known in the relevant arts. In a cloud computing environment, at least some of the applications, servers and data can be partially maintained and provided through a centralized cloud computing platform.

Embodiments are described for a data storage system implementing secure network data transfers by a bi-directional exchange of certificate authority (CA) certificates. Through this method, a server can securely send a CA certificate to the client, and the client can securely send a CA certificate to the server, both encrypted and inline as part of the authentication sequence. This bi-directional exchange enables both the client to verify the identity of the server, and the server to verify the identity of the client.

FIG. 1 is a diagram of a data storage system implementing secure bi-directional server-client authentication, under some embodiments. System 100 illustrates an example of a large-scale data processing storage system that may comprise a number of server and client computers coupled together in one or more public and/or private networks. System 100 includes a backup server 102 that executes a data storage or backup management process 112 that coordinates or manages the backup of data from one or more data sources to storage devices, such as storage system 106 or any other network (primary/secondary) storage, client storage, and/or virtual storage devices that may be provided. These storage devices serve as source storage devices that hold data to be backed up from the one or more data sources, such as database or other application server and client computers.

The backup data is sourced by any number of clients 104, which might be any type of network device, computer, file system, virtual machine, data center, and so on. The data sourced by the clients may be any appropriate data, such as database data that is part of a database management system or any other appropriate application. The backup server 102 causes or facilitates the backup of client data to storage system 106, which may at least be partially implemented through storage device arrays, such as RAID components. System 100 may be implemented to provide support for various storage architectures such as storage area network (SAN), Network-attached Storage (NAS), or Direct-attached Storage (DAS) that make use of large-scale network accessible storage devices, such as large capacity disk (optical or magnetic) arrays. In an embodiment, system 100 may represent a network that includes, among other elements, a Data Domain Restorer (DDR)-based deduplication storage system, such as provided by DellEMC Corporation. However, other similar backup and storage systems are also possible.

In an embodiment, the clients 104 may send certain OS level backup metadata, log files, and other such data to the backup server 102. In an embodiment, the storage system 106 may be implemented in a DellEMC Avamar™ system, which is used to backup file systems, virtual machines, low change rate databases, remote offices, and various client devices 104. In this system, an Avamar server may be selected as the backup target, in which case an Avamar client on each host performs deduplication segment processing with data and metadata stored on the Avamar server. If the Data Domain (DD) system is selected as the backup target, the backup data is transferred to the DD backup server 102 and the related metadata generated by the client software is simultaneously sent to the Avamar server (in storage system 106) for storage. The metadata allows the management system to perform data restores directly from the Data Domain system without going through the Avamar server.

In an embodiment, the backup server 102 implements a deduplication backup process as a form of single-instance storage that eliminates redundant copies of data to reduce storage overhead. For deduplication, only one unique instance of data is stored by replacing redundant data blocks with pointers to the unique data copy. As new data is written to a system, duplicate chunks are replaced with these pointer references to previously stored data. To service an input/output (I/O) operation initiated for deduplicated backups, the Data Domain File System (DDFS) must initiate multiple internal I/O operations, such as to lookup LP segment fingerprints, look up indexes, read container metadata, and to read the actual data before servicing the I/O to the backup application. However, the use of pointers greatly reduces the amount of data that needs to be stored.

In an embodiment, the deduplication process may be performed as a server-side process, such as by backup server 102. Alternatively, the deduplication process may be performed by a distributed deduplication process, such as by a client-side deduplication server 107. In an embodiment, deduplication server 107 implements the DD Boost ("Boost" or "DDBoost") protocol for performing distributed data processing and storage in large data processing and storage systems. DDBoost is a protocol offered by Data Domain for performing distributed deduplication of user data sent from a client application to a Data Domain server for persistent storage. With DDBoost, an application on a client 104 calls client library APIs that make remote procedure (RPC) calls to the Data Domain (backup) server 102. A client-side library cooperates with server-side code to perform distributed deduplication of user data to minimize the data that is actually sent to the server and to minimize the physical storage required to store the data. The architecture splits the DDBoost platform into separate components, one on the client system and one on the server system. DDBoost is essentially a hybrid process, where some of the deduplication steps occur on the client and some on the server, that is, it represents a distributed deduplication system.

Although embodiments are described with respect to deduplication backup systems, embodiments are not so limited. Backup systems not using deduplication methods can also be used with the secure authentication processes and components described herein. Likewise, example embodiments will be described in relation to a Data Domain and DDBoost architecture, however it should be noted that any other server-side, client-side, or distributed deduplication process or system that uses deduplication is also possible, as well as any data storage system that does not use deduplication, as stated above.

Although FIG. 1 illustrates an example embodiment showing one set of clients 104 and a single server 102 and storage system 106, it should be noted that system 100 may be scaled to any appropriate number of client-server computers, each with their own respective network connections to other internal or external system resources. Thus, system 100 may comprise a number of servers 107, a large number of distributed clients 104, one or more backup servers 102, and so on. The data and metadata transferred from the clients 104 to the backup servers and storage systems may be transmitted through a wide-area network 110, which may be implemented as an Internet Protocol (IP) network, or any similar type of WAN, LAN, metropolitan area network (MAN), and so on.

As stated earlier, in a typical data storage system with (many) multiple clients 104, some method of client verification must be implemented to ensure data integrity and security. Certificate-based authentication schemes require managing, deploying, and updating certificates in large-scale environments. In some embodiments, an inline method of certificate exchange has been developed to streamline the authentication process. Embodiments extend present one-way (or unidirectional) methods to support a bi-directional exchange of certificate authority (CA) certificates. That is, a method where the server can securely send a CA certificate to the client, and the client can securely send a CA certificate to the server, both encrypted and inline as part of the authentication sequence. This bi-directional exchange efficiently enables the client to verify the identity of the server and for the server to verify the identity of the client.

Verification of the servers and clients with each other during any type of data transmission is necessary to prevent various types of malicious attacks. One common type of attack is a man-in-the-middle (MITM) attack in which an attacker inserts themselves between the client-server and secretly intercepts and possibly alters the data transmitted between them.

In an embodiment, to avoid the possibility of such an MITM attack, all communications between and among the servers, clients, and storage system 306 occur over a mutually authenticated encrypted connection, such as a Transport Layer Security (TLS) or other Internet encrypted connection between the backup server and backup client. Thus, embodiments can be implemented using TLS (or similar) connections.

In an embodiment, the computer name (e.g., backup client or server) corresponds to the common name (CN) or subject alternative name (SAN) of the computer's X.509 certificate, where X.509 is a standard for a format of public key certificates, such as used in TLS (transport layer security) or SSL (secure sockets layer). An X.509 certificate contains its own public key and an identity (a hostname, or an organization, or an individual), and is either signed by a certificate authority or is self-signed. When a certificate is signed by a trusted certificate authority, or validated by other means, someone holding that certificate can rely on the public key it contains to establish secure communications with another party, or validate documents digitally signed by the corresponding private key for the certificate's public/private key pair.

In general, a certificate authority (CA) is an entity that stores, signs, and issues digital certificates that certify the ownership of a public key by the named subject of the certificate. This allows others (relying parties) to rely upon signatures or on assertions made about the private key that corresponds to the certified public key. A CA acts as a trusted third party, i.e., one that is trusted both by the subject (owner) of the certificate and by the party relying upon the certificate. The format of these certificates is specified by certain standards.

Trusted certificates can be used to create secure connections to a server (or other computer) via the Internet. A certificate is essential in order to circumvent a malicious party which happens to be on the route to a target server that acts as if it were the target. As mentioned above, such a scenario is commonly referred to as a man-in-the-middle (MITM) attack. The client uses the CA certificate to authenticate the CA signature on the server certificate as part of the authorizations before launching a secure connection. Usually, client software, such as web browsers, include a set of trusted CA certificates. A malicious or compromised client can skip any security check and still fool its users into believing otherwise.

The DDBoost protocol is an RPC based protocol which supports certificate-based authentication using SSL-TLS (Secure Sockets Layer-Transport Layer Security) protocol. The protocol expects respective certificates provided on the client as well as server side. Of the various authentication modes supported by DDBoost, one-way and two-way authentication modes are based on certificates. Two-way authentication mode is typically the most secure as it involves client and server both verifying certificates of each other using CA certificate, it also requires a whole certificate management process to be done by one application. It is expected that the application or someone orchestrates the certificate generation for client, server, gets those certificates signed by CA and makes these certificates available to the client and server. This makes it mandatory to have this certificate orchestration as a prerequisite for the use of secured authentication method.

Embodiments of system 100 through component 114 provide a method to support a bi-directional exchange of CA certificates. That is, a method where the server can securely send a CA certificate to the client, and the client can securely send a CA certificate to the server, both encrypted and inline as part of the authentication sequence for data transmissions.

Figure 2:
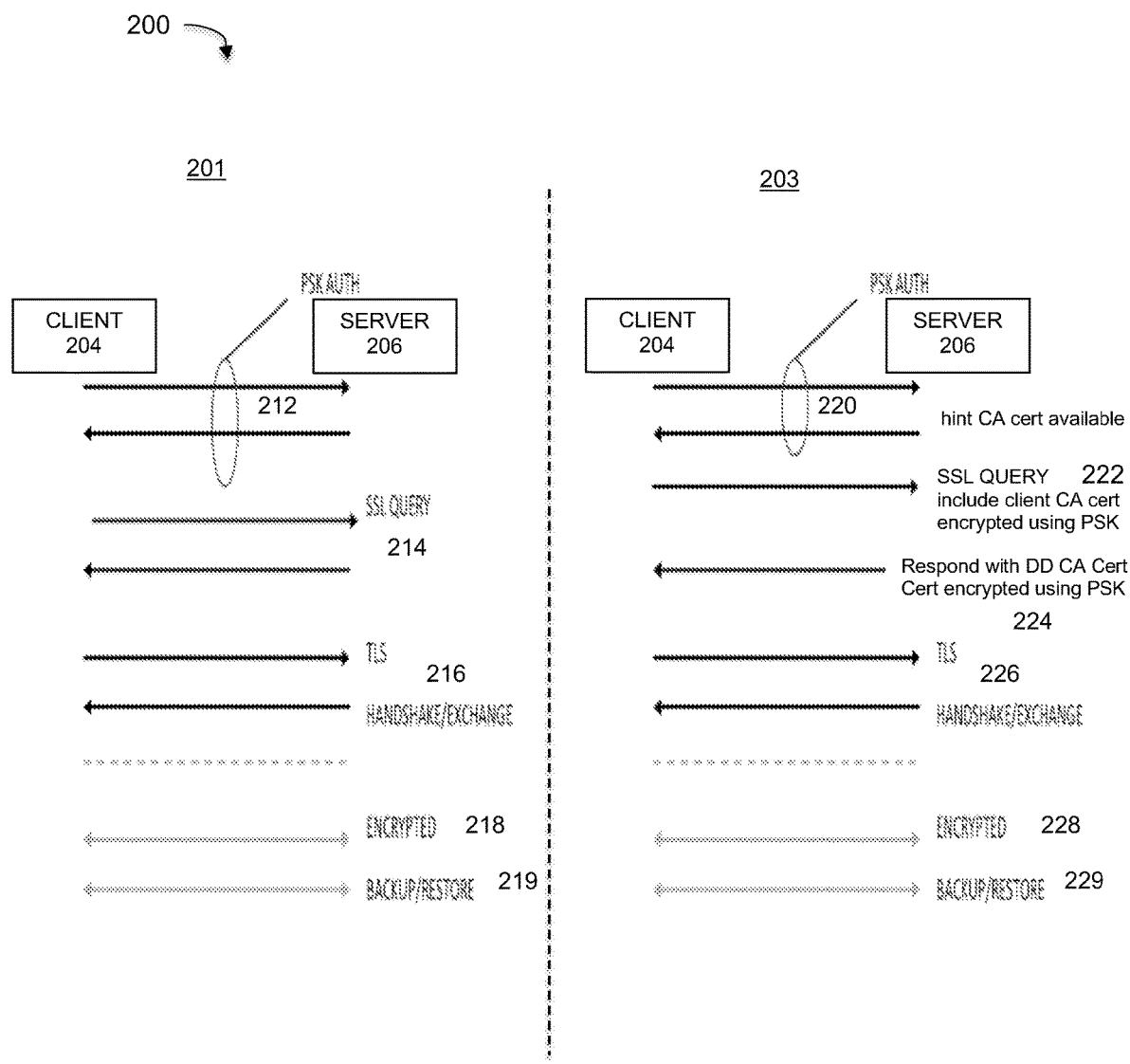
FIG. 2 illustrates a sequence of operations for a backup process using two-way inline certificate authentication, under some embodiments.

FIG. 2 illustrates a sequence of operations for a backup process using two-way inline certificate authentication, under some embodiments. Diagram 200 of FIG. 2 illustrates some of the processing steps among a backup server 202, a backup client 204, and a storage system 206. As part of the overall process 200, processing component 114 is used to setup a secure connection using a pre-shared key (PSK). Once this is successful, it encrypts and returns the backup server's CA certificate (public key) and has the client in-turn return its own CA certificate to the server. The TLS handshake can be repeated, this time using two-way authentication as the backup server's CA certificate is now available on the client, and the client's CA certificate is now available on the server. This method enables a client previously only able to use a pre-shared key (PSK) based cipher-suite (e.g., TLS_PSK_WITH_AES256_CBC_SHA) to secure their connection, and to use a more secure cipher-suite (e.g., DHE-RSA-AES256-GCM-SHA384) without the usual overhead of certificate management methods.

In general, a PSK uses a shared secret that was previously shared by two parties using a secure channel prior to its use by symmetric key cryptographic algorithms.

FIG. 2 illustrates two different client-server authentication processes, 201 and 203. For process 201, a PSK authentication process is used to exchange the PSK, 212. In step 214, an SSL query compares the client 204 and server 206 TLS settings and uses the most secure setting, or fails the connection if the most secure setting is not possible based on client configuration. A TLS handshake/exchange process 216 is then performed. As is understood, a TLS handshake is a negotiation between the two parties to establish the details of their connection, such as SSL/TLS version to use, which cipher suite to use for encryption, and so on.

If, during this handshake 216, the client 204 specifies no encryption and the server 206 has anonymous or two-way password plus encryption, the exchange will use the corresponding encryption setting. If the client 204 specifies no encryption and the server 206 indicates one-way or two-way with encryption, the system fails the connection. If the client specifies one-way or two-way, the exchange respectively uses one-way or two-way, and assumes that the certificates are configured properly on the server. The data is then encrypted 218 and transferred through the appropriate backup (client to server) or restore (server to client) operation 219.

As stated above, and as shown in FIG. 2, in some cases, if the client 204 specifies no encryption and the server 206 indicates one-way authentication, the system will send server CA certificate to the client and will use the CA certificate received from the client to use for a one-way TLS exchange to verify the server identity by the client. This comprises a unidirectional certification process of server to client authentication. An example of such a process is illustrated in FIG. 3, which is a flowchart illustrating a method of using CA certificates in an inline unidirectional authentication, under some embodiments.

Figure 3:
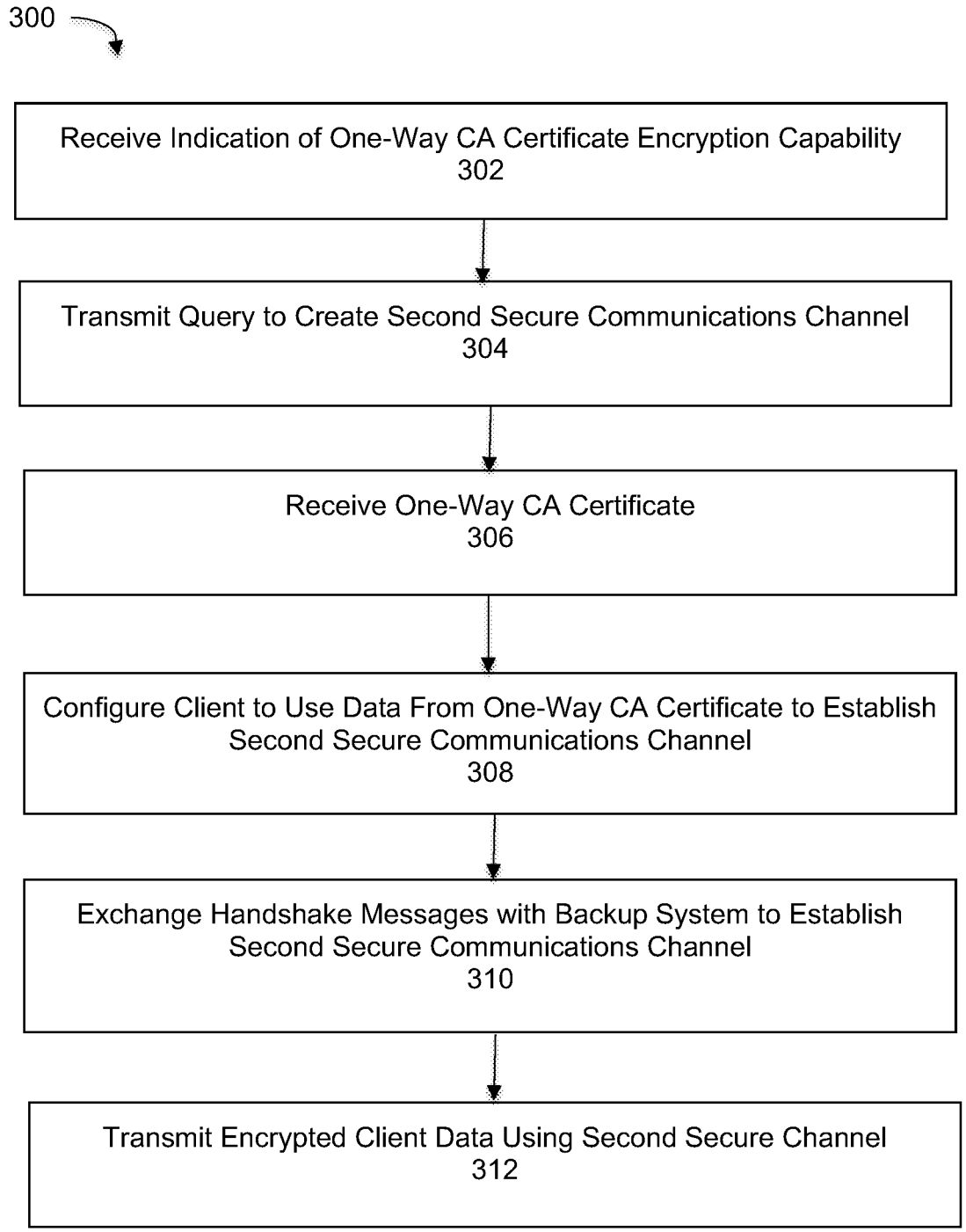
FIG. 3 is a flowchart illustrating a method of using CA certificates in an inline unidirectional authentication from a client perspective, under some embodiments.

As shown in FIG. 3, process 300 begins with the client receiving a message across a first secure communications channel from a backup system across a network connection, 302. The first secure communications channel may be secured with previously-shared encryption key accessible by both the client system and the backup system i.e. a PSK. The message may include an indication of one-way CA certificate encryption capability, which may provide a higher degree of security than the first secure communications channel. The client system may have security settings that do not require CA encryption, while the backup system may have security settings requiring at least one-way CA certificate encryption.

In response to the message and via the first secure communications channel, the client transmits a request to create a second secure communications channel using the one-way CA certificate, 304. The client system receives the one-way CA certificate, 306, which may include data in the form of a public key associated with the backup system.

The client may configure itself to use data (e.g., the public key associated with the backup system) from the one-way CA certificate to establish the second secure communications channel, 308. This configuration may include, for example, generating a session key based on the data from the one-way CA certificate and key data on the client system (e.g., a private key of a public-private key pair). After the configuration is complete, the backup system exchanges handshake messages that are encrypted using the data from the one-way CA certificate, 310. For example, the handshake messages may be encrypted using the session key derived using the public key included in the one-way CA certificate. After the handshake procedure is complete, the client system may transmit, via the established second secure communications channel generated as a result of a successful handshake procedure, encrypted client data to the backup system, 312.

Figure 4:
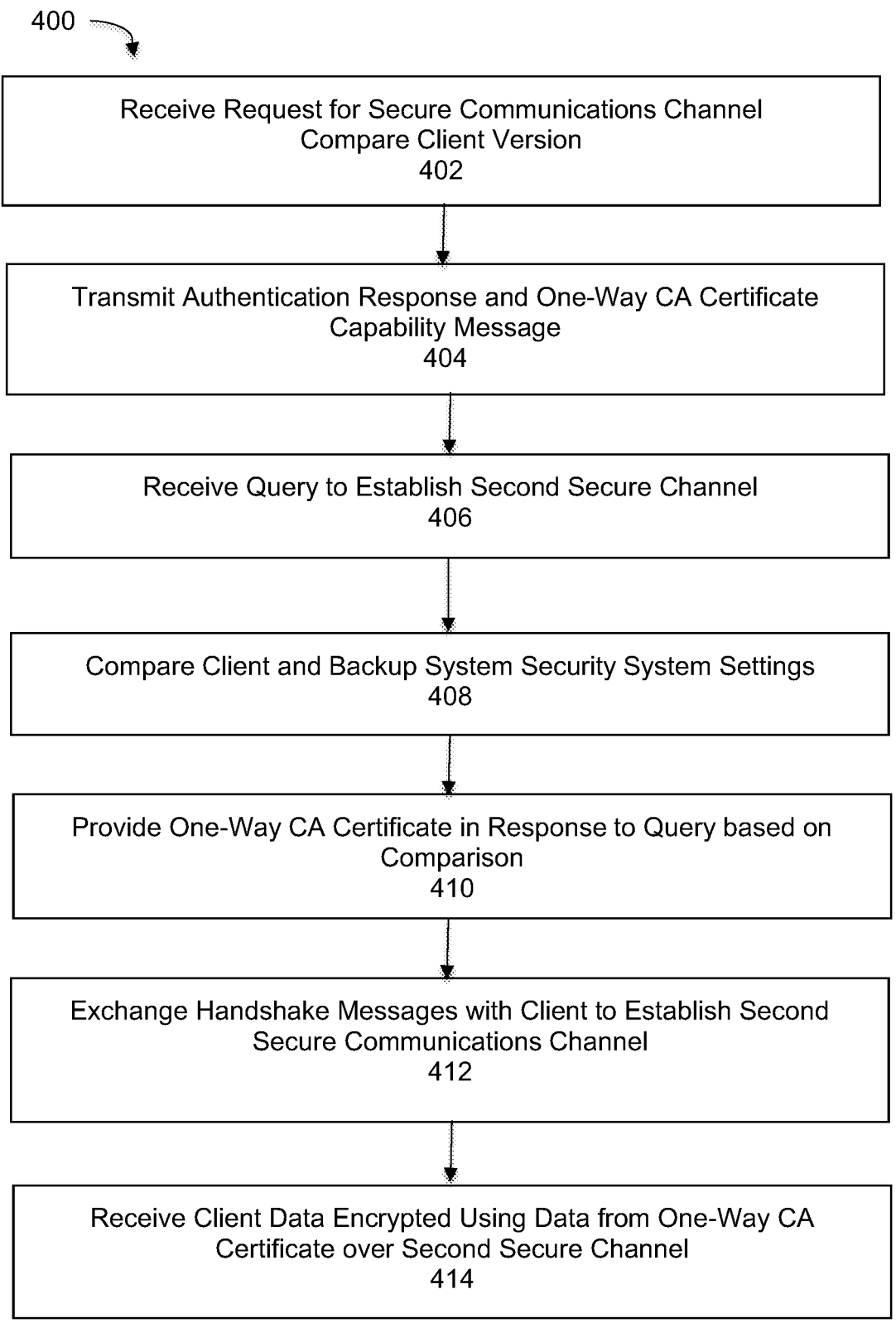
FIG. 4 is a flowchart illustrating a method of using CA certificates in an inline unidirectional authentication from a server perspective, under some embodiments.

FIG. 4 is a flowchart illustrating a method of using CA certificates in an inline unidirectional authentication from a server perspective, under some embodiments. Process 400 starts with step 402 in which backup system receives, from a client a request for a first secure communications channel. The messages across the first secure communications channel may be secured with previously-shared encryption key (i.e., a PSK) accessible by both the client system and the backup system. As noted above, receiving the request for the first secure communications channel may trigger the comparison of the client version to determine if the client version supports CA certificate encryption. When the backup system determines that the client version supports CA certificate encryption, the backup system responds by completing the PSK authentication, where the authentication includes transmitting a message indicating that the backup system is capable of one-way CA certificate encryption, 404. In some embodiments, this message may be transmitted based on the backup system identifying that the received client version of the file transfer protocol supports receiving a CA certificate.

In 406, the backup system may receive a query to establish a second secure communications channel (e.g., an OpenSSL query). In response to receiving the query, the backup system compares security the settings of the client system received with the query to backup system security settings to determine what level of security is supported, 408. When the backup system determines that one-way CA certificate encryption is required, based on the comparison of security settings, the backup system prepares to establish the second secure communications channel, 410. In some embodiments, the backup system may create a context associated with the second secure communications channel, which includes creating a pointer to a one-way CA certificate to a location in memory on the backup system. In response to the query and the comparison, the backup system may provide the one-way CA certificate at 410, where the one-way CA certificate is transmitted via the first secure communications channel (and accordingly, is encrypted using the pre-shared key prior to the transmission).

After the backup server has created the context associated with the second secure communications channel, the backup system and the client system may exchange, via the first secure communications channel, handshake messages that are encrypted using the data from the one-way CA certificate, 412. This may be done, for example, by the backup system receiving handshake messages associated with the second secure communications channel from the client system that are encrypted using data from the one-way CA certificate (e.g., a session key derived from a public key included in the one-way CA certificate). After the second secure communications channel, which is secured with the data from the one-way CA certificate, has been established in response to the exchange of handshake messages, the backup system may receive, via the second secure communications channel, encrypted client data for storage on the backup system, 414.

The methods and systems above describe a unique way of securely exchanging CA certificate inline there by making it easy for client-server to continue with certificate-based authentication. The certificate is transferred in a secure way where it is encrypted with a pre-shared key based on Diffie-Hellman (DH) parameters. The inline CA certificate transfer advantageously lifts the burden from applications to maintain and save the CA certificate so that client can use the CA certificate during authentication.

As shown in FIG. 2, process 203 extends the unidirectional embodiment of process 201 to include bi-directional exchange of CA certificates so that the server can verify the identity of the client, in addition to the client verifying the identity of the server (as described above). Thus, the process 201 (and 300, 400) is improved by exchanging the client and server CA certificates between each party, and performing one or more TLS handshake operations using the server's CA certificate as stored in the client, and the client's CA certificate as stored in the server. This is shown in FIG. 2, as process 203 in which a PSK authentication step 220 is followed an SSL query 222 that includes client's CA certificate encrypted using the PSK. The server 206 then responds with the server's CA certificate, 224, depending on the handshake settings from 226.

During the handshake process 226, the process compares the client and server TLS settings and uses the most secure setting or fails the transfer if the most secure setting is not possible based on client configuration. In a client server network, the most secure setting is two-way encryption where both the client and the server encryption. This most secure setting is always used if it is available. When neither the client nor server specify encryption (no encryption), this is the least secure, and where one specifies encryption while the other does not (one-way), this is partially secure. As an example of system configuration, if either client or server specify two-way, two-way will be used; if the client specifies none and the server indicates one-way, then one-way will be used, or vice versa, and so on.

In system 200, as part of the SSL query 222, the client 204 specifies its configured method of authentication (i.e., none, one-way, two-way) and the server 206 compares this setting with its configured/required configuration (i.e., none, one-way, two-way), and the appropriate encryption mode is then used, or the transfer is failed, if necessary.

In process 203, the client always sends its CA certificate as part of the exchange. If the client specifies none, one-way, or two-way authentication and the server 206 indicates two-way authentication, the system sends the server CA certificate to the client 224 and will use the CA certificate received from the client to establish a two-way TLS exchange 226. The data is then encrypted 228 and transferred through the appropriate backup (client to server) or restore (server to client) operation 229.

As shown in FIG. 2, the CA certificates are encrypted with PSK, thus protecting them from a MITM attack. It should be noted that present versions of OpenSSL (1.0.2.xxx) do not support any PSK-based ciphers recognized as having a STRONG security rating. Embodiments of the inline bi-directional authentication process 114 enables a user to setup a connection using a cipher-suite recognized as STRONG without the need to deploy certificate management. This also enables the most secure method of authentication where both the client and server verify the identity of each other.

Figure 5:
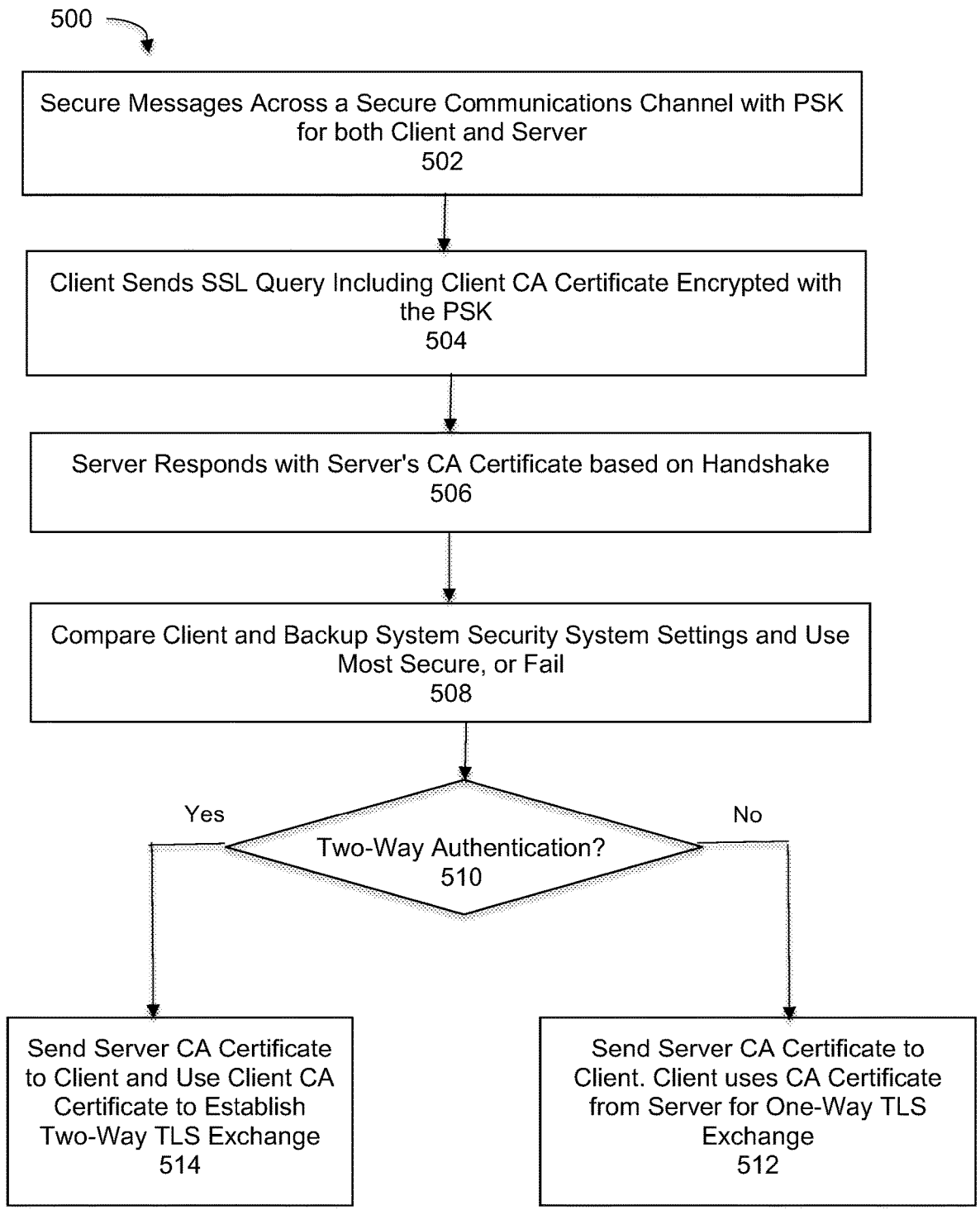
FIG. 5 is a flowchart illustrating a method of using CA certificates in an inline bi-directional authentication, under some embodiments.

FIG. 5 is a flowchart illustrating a method of using CA certificates in an inline bi-directional authentication, under some embodiments. Process 500 of FIG. 5 begins with securing messages across a secure communications channel with previously-shared encryption key (i.e., a PSK) accessible by both the client system and the backup system, 502. This PSK authentication step is followed an SSL query from the client that includes client's CA certificate encrypted using the PSK, 504. The server then responds with the server's CA certificate, depending on the handshake settings, 506. During the handshake process, the system compares the client and server TLS settings and uses the most secure or fails if the most secure setting is not possible based on client configuration, 508. Thus, for example, if the client specifies no encryption and the server has anonymous or two-way password plus encryption, the exchange will use the corresponding encryption setting; but if the client specifies no encryption and the server indicates one-way or two-way with encryption, the system fails the connection.

In determination step 510, the system determines whether one-way (unidirectional) or two-way (bi-directional) authentication is to be used.

If, in step 510, the client specifies no encryption and the server 206 indicates one-way authentication, the system will send the server CA certificate to the client and the client will use the CA certificate received from the server for the one-way TLS exchange to verify the identity of the server, 512. For such a one-way exchange, the client generally never sends its CA certificate to the server.

If the server indicates two-way authentication in 510, the system sends the server CA certificate to the client and will use the CA certificate received from the client to establish a two-way TLS exchange, 514. If the client specifies one-way or two-way, the exchange respectively uses one-way or two-way, and assumes certificates are configured properly on the server.

In general, the described method provides a unique way of securely exchanging CA certificate inline thereby making it easy for client-server to continue with certificate-based authentication. The client's CA certificate is transferred in a secure way where it is encrypted with a pre-shared key based on DH parameters. The server's CA certificate is transferred in a secure way where it is encrypted with a pre-shared key based on the DH parameters. The process reduces the burden from applications to maintain and save the CA certificate so that client can pick that during authentication. It also reduces the burden from server to maintain and save the CA certificate of the client so that server can select it to be used during authentication, and helps enable large scale deployments where server can maintain CA and send it to client. For example, this way there is no need for thousands of clients to maintain CA certificates.

For CA certificate replacement, revival can be done at a single place, i.e., at the server, and the client can continue to work seamlessly. Embodiments can be extended to even send Certificate Revocation List (CRL) along with the CA certificate, which the client can use to validate further communication with the server. The revocation of CA certificate can be handled at a single place as opposed to multiple clients.

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 6:
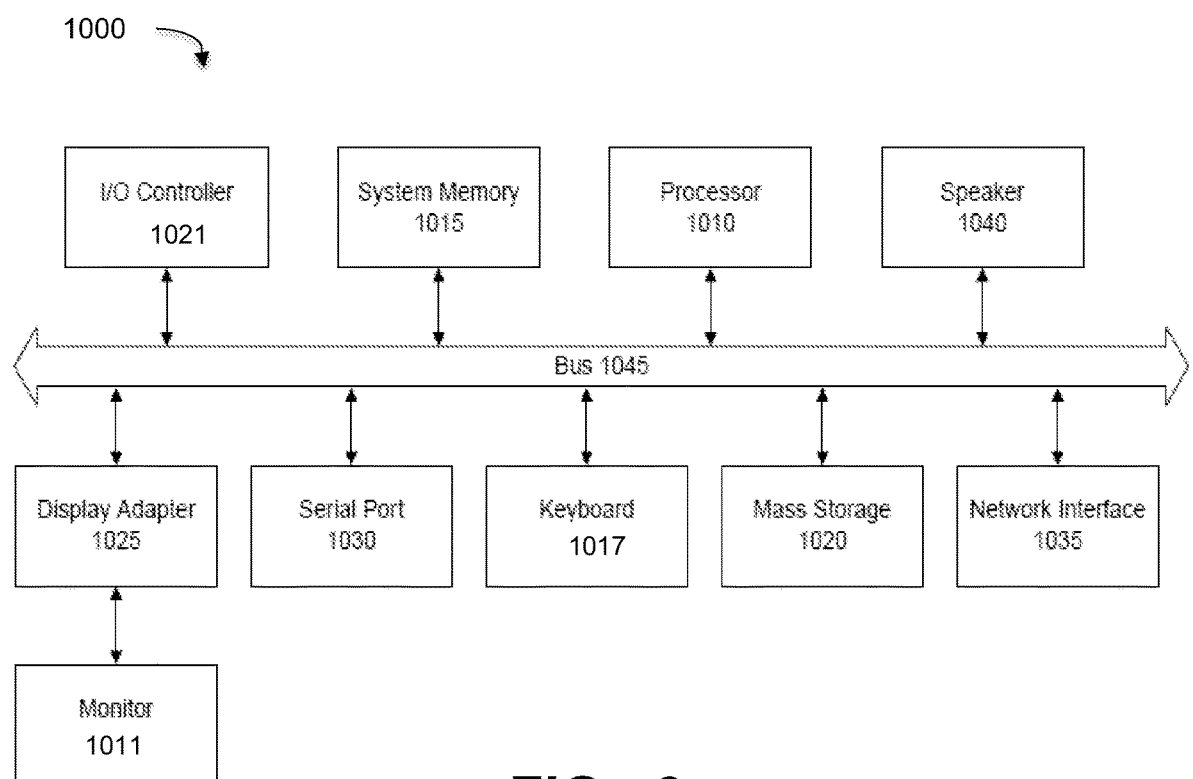
FIG. 6 is a system block diagram of a computer system used to execute one or more software components implementing the described processes, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 is a system block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system may be one of the Microsoft Windows, Linux, Mac OS X, IRIX32, or IRIX64, and so on.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11x, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of securely exchanging Certificate Authority (CA) certificates in a client-server in a network of a backup system, comprising:
    establishing, between a server and a client, a secure communications channel of the network secured with a previously-shared encryption key (PSK);
    first sending, from the client to the server, a client CA certificate encrypted with the PSK;
    second sending, from the server to the client, a server CA certificate encrypted with the PSK;
    first determining, in a handshake operation between the client and server, if the server specifies one-way authentication, and, if so, sending the server CA certificate to the client in a one-way exchange; and
    second determining, in the handshake operation, if the server specifies two-way authentication, and, if so, sending the server CA certificate to the client and the client CA certificate to the server in a two-way exchange.

2. The method of claim 1, wherein the handshake operations comprise determining an encryption method for data transferred between the client and server to use a most secure encryption setting if available from among two-way encryption or one-way encryption, or fail the transfer if the most secure encryption setting is not possible based on a configuration of the client.

3. The method of claim 1, wherein the network implements a Secure Sockets Layer/Transport Layer Security (SSL/TLS) communications protocol.

4. The method of claim 2, wherein the first sending comprises sending an SSL query from the client to the server.

5. The method of claim 4, wherein the handshake operation compares respective client and server TLS settings encoded in each of the client and the server.

6. The method of claim 1, wherein the first determining and second determining steps each further determine whether or not the client specifies no encryption.

7. The method of claim 6, wherein if the client specifies one-way authentication, the method further comprises sending the server CA certificate to the client in a one-way exchange, otherwise, if the client specifies one-way authentication but the server specifies two-way authentication, the method further comprises sending the server CA certificate to the client in a two-way exchange.

8. The method of claim 1, wherein the client CA certificate and server CA certificate are each encrypted using one or more Diffie-Hellman (DH) parameters.

9. The method of claim 8, wherein data from the each of the client CA certificate and server CA certificate include a public key of a public key-private key pair that is based on a predetermined cipher suite.

10. A computer-implemented method of securely exchanging Certificate Authority (CA) certificates in a client-server in a network of a backup system, comprising:
    sending, from the client to the server, a client CA certificate encrypted with a previously-shared encryption key (PSK) exchanged over a secure communications channel of the network;
    receiving by the client from the server, a server CA certificate encrypted with the PSK;
    first determining, in a handshake operation between the client and server, if the server specifies one-way authentication, and, if so, sending the server CA certificate to the client in a one-way exchange; and
    second determining, in the handshake operation, if the server specifies two-way authentication, and, if so, sending the server CA certificate to the client and the client CA certificate to the server in a two-way exchange.

11. The method of claim 10, wherein the handshake operations comprises determining an encryption method for data transferred between the client and server to use a most secure encryption setting if available, or fail the transfer if the most secure encryption setting is not possible based on a configuration of the client.

12. The method of claim 10, wherein the network implements a Secure Sockets Layer/Transport Layer Security (SSL/TLS) communications protocol, and wherein sending comprises sending an SSL query from the client to the server, and wherein the handshake operation compares respective client and server TLS settings encoded in each of the client and the server.

13. The method of claim 10, wherein the first determining and second determining steps each further determine whether or not the client specifies no encryption.

14. The method of claim 13, wherein if the client specifies one-way authentication, the method further comprises sending the server CA certificate to the client in a one-way exchange, otherwise, if the client specifies one-way authentication but the server specifies two-way authentication, the method further comprises sending the server CA certificate to the client in a two-way exchange.

15. The method of claim 14, wherein the client CA certificate and server CA certificate are each encrypted using one or more Diffie-Hellman (DH) parameters, wherein data from the each of the client CA certificate and server CA certificate include a public key of a public key-private key pair that is based on a predetermined cipher suite.

16. A computer-implemented method of securely exchanging Certificate Authority (CA) certificates in a client-server in a network of a backup system, comprising:
    sending, from the server to the client, a server CA certificate encrypted with a previously-shared encryption key (PSK) exchanged over a secure communications channel of the network;
    receiving by the server from the client, a client CA certificate encrypted with the PSK;
    first determining, in a handshake operation between the client and server, if the server specifies one-way authentication, and, if so, sending the server CA certificate to the client in a one-way exchange; and
    second determining, in the handshake operation, if the server specifies two-way authentication, and, if so, sending the server CA certificate to the client and the client CA certificate to the server in a two-way exchange.

17. The method of claim 16, wherein the handshake operations comprises determining an encryption method for data transferred between the client and server to use a most secure encryption setting if available, or fail the transfer if the most secure encryption setting is not possible based on a configuration of the client.

18. The method of claim 16, wherein the network implements a Secure Sockets Layer/Transport Layer Security (SSL/TLS) communications protocol, and wherein sending comprises sending an SSL query from the client to the server, and wherein the handshake operation compares respective client and server TLS settings encoded in each of the client and the server, and further wherein the client CA certificate and server CA certificate are each encrypted using one or more Diffie-Hellman (DH) parameters, yet further wherein data from the each of the client CA certificate and server CA certificate include a public key of a public key-private key pair that is based on a predetermined cipher suite.

19. The method of claim 16, wherein the first determining and second determining steps each further determine whether or not the client specifies no encryption.

20. The method of claim 16, wherein if the client specifies one-way authentication, the method further comprises sending the server CA certificate to the client in a one-way exchange, otherwise, if the client specifies one-way authentication but the server specifies two-way authentication, the method further comprises sending the server CA certificate to the client in a two-way exchange.

* * * * *